(12) United States Patent
Andersson Reimer et al.

(10) Patent No.: US 9,285,952 B2
(45) Date of Patent: Mar. 15, 2016

(54) METHOD AND APPARATUS FOR OPERATION OF A COMPUTING DEVICE

(71) Applicant: BlackBerry Limited, Waterloo (CA)

(72) Inventors: Nils Roger Andersson Reimer, Malmö (SE); Tim Kjell Jeppsson, Malmö (SE)

(73) Assignee: BlackBerry Limited, Waterloo, Ontario (CA)

( * ) Notice: Subject to any disclaimer, the term of this patent is extended or adjusted under 35 U.S.C. 154(b) by 351 days.

(21) Appl. No.: 13/630,962

(22) Filed: Sep. 28, 2012

(65) Prior Publication Data

US 2013/0187957 A1    Jul. 25, 2013

Related U.S. Application Data

(60) Provisional application No. 61/590,224, filed on Jan. 24, 2012.

(51) Int. Cl.
| | |
|---|---|
| G09G 5/00 | (2006.01) |
| G06F 3/0482 | (2013.01) |
| G06F 9/44 | (2006.01) |
| G06F 3/0488 | (2013.01) |
| G06Q 10/00 | (2012.01) |
| G06Q 10/10 | (2012.01) |

(52) U.S. Cl.
CPC ........... G06F 3/0482 (2013.01); G06F 3/0488 (2013.01); G06F 8/38 (2013.01); G06Q 10/00 (2013.01); G06Q 10/1093 (2013.01); G06F 9/4443 (2013.01)

(58) Field of Classification Search
CPC ................................ G06F 9/4443; G06F 8/38
USPC .................................................... 715/963, 762
See application file for complete search history.

(56) References Cited

U.S. PATENT DOCUMENTS

| | | | |
|---|---|---|---|
| 6,868,283 | B1 | 3/2005 | Bonansea et al. |
| 2002/0196280 | A1* | 12/2002 | Bassett et al. ................. 345/751 |
| 2005/0073443 | A1* | 4/2005 | Sheha et al. ............... 340/995.1 |
| 2009/0174680 | A1* | 7/2009 | Anzures et al. .............. 345/173 |
| 2013/0024206 | A1* | 1/2013 | Hughes et al. .................... 705/3 |

FOREIGN PATENT DOCUMENTS

| | | |
|---|---|---|
| EP | 1659766 | 5/2006 |
| EP | 2015176 | 1/2009 |

OTHER PUBLICATIONS

European Patent Office, Extended European Search Report issued in European Application No. 12186639.6, mailed Aug. 5, 2013, 6 pages.
Communication Pursuant to Article 94(3) EPC issued in European Application No. 12186639.6 on Nov. 16, 2015.

* cited by examiner

*Primary Examiner* — Andrea Leggett
(74) *Attorney, Agent, or Firm* — Fish & Richardson P.C.

(57) ABSTRACT

A method and computing device are provided for showing affordance of list scroll-ability within a display of a computing device. As part of the rendering process of the graphical user interface a user is prompted through the provision of additional data to that ultimately displayed to consider that the final displayed list is a subset of data which may be accessed through the graphical user interface.

19 Claims, 11 Drawing Sheets

METHOD AND APPARATUS FOR OPERATION OF A COMPUTING DEVICE

BACKGROUND

1. Technical Field

The present application relates generally to the operation of a computing device and particularly to a display of information and the input of data to a communications device.

2. Description of the Related Art

The use of communication devices, and in particular mobile communication devices, has extended to allow a user to receive voice calls and to send and receive electronic communications, which may include e-mail, short message service (SMS), multimedia messaging service (MMS) and video messaging service (VMS) messages, as well as other forms of messages. This messaging is typically provided in one or more modules which are executable within a processor of the device and which are individually accessible by a user on demand.

With the increase in processing capacity of these devices, more and more functionality is provided within the device and is available to a user. For example, it is known to provide devices with calendar functionality whereby a user can enter and store calendar data within the device. This calendar data may be accessed directly on the device and can be input directly on the device. It can also be entered in a second computing device—for example a personal computer- and then relayed for subsequent storage on the device. While the storage of such information in a portable device is very useful there are associated problems related to the dimensions of these devices. While display screen sizes have increased, they are still relatively small compared to conventional computing displays. With a limited footprint there are difficulties in how to enable a user to access the information that is stored within the device. Typically, a user needs to switch between distinct modules to access different functionality or data within the device. As a result of the limited display footprint on the device, the switching between modules typically effects a replacement of information from a displayed module with information from the new module.

For example when scheduling a meeting or other time based event, in order to ensure that the intended meeting does not conflict with an already scheduled event, a user needs to access their calendar to confirm availability based on pre-stored events. This accessing of the calendar module effects a display on the display of the device of calendar information. The user then needs to switch to a separate scheduling module to enter details of the new meeting. This effects a replacement of the calendar information on the display with the information specific to the schedule module. As a result the calendar information is lost and the user needs to rely on memory when determining an appropriate time slot.

BRIEF DESCRIPTION OF THE DRAWINGS

In drawings which illustrate by way of example only embodiments of the present application.

DETAILED DESCRIPTION

Figure 1:
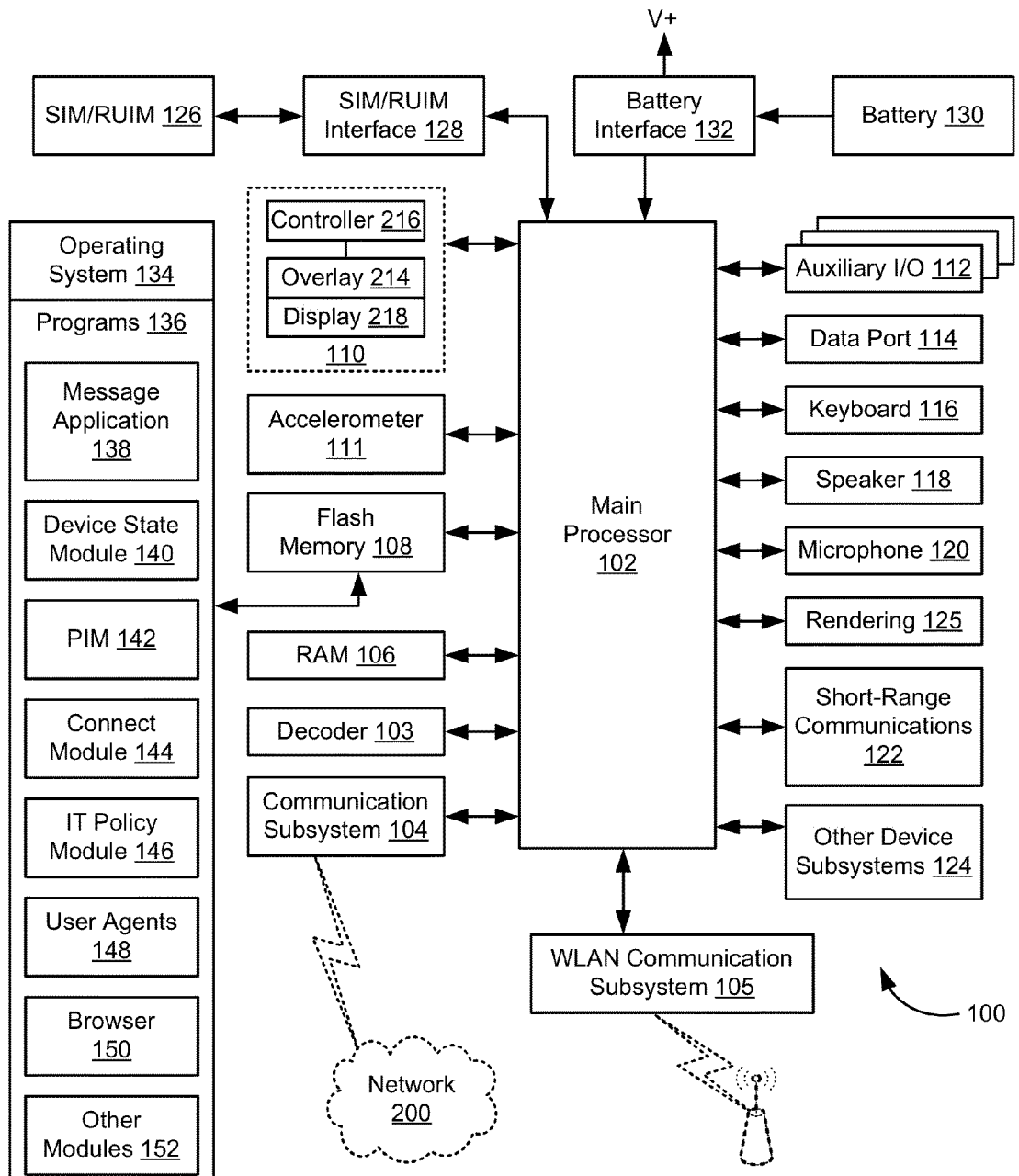
FIG. 1 is a block diagram of an embodiment of a computing device.

The embodiments described herein provide a system, method and apparatus for improved processing of image data as part of generation of a user interface display. In a first aspect a method of generating a graphical user interface on a display of a computing device is provided. The method is particularly suitable for displays whose area and as a result capacity for display is less than the total area of the data to be displayed. Such displays are typically found in wireless computing devices which are battery powered. There is, in the context of such devices, a tradeoff between screen area and the power consumption of displays of increased size. Where the devices are primarily battery powered, it is important that the power consumption of hardware and software modules of the device are designed so as to optimize the time within which the device may operate in the absence of recharging. This, in combination with the intended use of the devices as portable devices, usually results in small screen sizes.

Where there is a desire to display data from two or more data sources or modules executable within the device, there is often a difficulty in having a sufficient area in the display of the device to display that data concurrently. A solution is to allow a user to toggle or switch between the applications that use each of the data sources such that the display can sequentially display information related to each of the data sources respectively. This information is typically provided as a rendered graphic on the display of the computing device. It will be appreciated however that each toggle or activation of a specific program or module executing on the device is a drain on the battery as the refresh of the information provided on the display requires processing. Furthermore the user is required to provide additional interface commands to the device to effect a changeover of the information being displayed. This requirement for multiple sequential commands and their subsequent execution by the processor of the computing device has an effect on the processor activity of the mobile device and the associated battery consumption In the context of scheduler and calendar modules, it will be appreciated that while both are time and/or date related, and provide a user with a different interface to time and date information stored within the computing device, it is typical for these modules to be distinct modules within the computing device and require specific independent activation by a user to access the data relevant to each of the scheduler and calendar modules. Within the context of the present teaching this information may be considered as being stored in distinct first and second data stores for each of the scheduler and calendar modules respectively. It will be appreciated that data architectures employed within computing devices may allow for the use of a single data structure which is configured using flags or the like to include data fields that are specific to each of the scheduler and calendar modules. When retrieving scheduler information the device is configured to access those fields that are associated or defined for the scheduler. Similarly, when retrieving calendar information the device is configured to access those fields that are associated or defined for the calendar. Some of the scheduler fields could also be calendar fields, i.e. there is common data to each of the scheduler and calendars. Other architectures may provide for complete separation of the data for each of the scheduler and calendar. Within the context of the present teaching the general terms first and second data sources will be used for that data that is specific to each of the scheduler and calendars respectively, irrespective of whether it is sourced from a common data structure or distinct independent data structures.

It will be appreciated that irrespective of how it is actually stored, the specific data for a calendar will typically will be addressed and retrieved differently than the data for a scheduler. Each time a user accesses their calendar data, a processing command is required and this is a battery consumption event. Similarly, for a scheduler and the access of scheduler data, the retrieval of scheduler information from data stores requires processing activity.

These scheduler and calendar modules provide interfaces to time and date information within the computing device. It is possible within the context of many so-called smartphones or other computing devices to provide for a parallel running of scheduler and calendar modules. While both modules are concurrently executing, only the information relating to the module that is executing in the foreground is presented to the user on the display of the computing device. In this way the user only sees the information from one of the two modules while at the same time the concurrent execution of the two modules is a drain on the battery of the device. These and other problems are addressed in accordance with the present teaching by a method comprising:

a. In response to an input to the device, generating an area of the user interface to display data from a first data source;
  b. Retrieving data from a second data source, the data from the second data source being time-related to the data from the first data source;
  c. Concurrently displaying a representation of the data from the second data source within said area.

In this way, when a user accesses a first module of a device, in addition to data consistent with what they would expect to retrieve for that first module, i.e. data from a first data store, they are also concurrently and without having to activate a second module provided with data from a second data store. The device provides the user with a concurrent display of data which traditionally was only accessed and displayed separately.

In an aspect the method may further comprise, subsequent to the concurrent display of the data from the first and second data sources and, in response to an input to the device, permitting a writing of data to the first data source. In this way the display presents data from two different sources concurrently to facilitate the input of data to one of the two data sources. In the context of a scheduler and calendar, the device is configured to provide the user with calendar data to assist in their selection of appropriate times for generating and storing schedule events.

The data from the second data source may be overlaid on the data from the first data source such that the graphical user interface correlates the data from the first and second data sources to provide contextual data. This is particularly useful in where the data from one of the two sources will determine whether or not it is appropriate to write data to the other of the two sources. Such an example is where a user wishes to schedule an event and to record that within a scheduler module's data store of the computing devices but does not want to schedule that event to conflict with another already stored diary event in a calendar module's datastore. By providing an overlay or other layering arrangement it may be possible to provide a display wherein the representation of data from the second data source is visible through the data displayed from the first data source; in the example of a scheduler and calendar, calendar information is visible through the scheduler fields As was discussed heretofore, the above may be particularly advantageous in the scenario of correlating or cross-referencing time information between two different data sources. In one aspect of the present teaching the first data source is a scheduler module of the computing device and the second data source is a calendar module of the computing device.

To allow a user to input data to the first data store, the method may provide in one aspect an arrangement wherein the generating a graphical display consistent with data from a first data source generates first and second data input fields.

These first and second data fields may be configured to define time and date fields. Such a definition will allow a user to separately input time and date information for subsequent storage within the first data store of the device.

In one aspect of the present teaching, the data from the second data source includes previously stored data from a calendar relating to the displayed time and date fields and indicating availability of a user within the displayed time and date fields. This data from the second data source may include previously stored data from a plurality of calendars and indicating availability of a plurality of users within the displayed time and date fields.

In an aspect of the present teaching, the data from the second data source is displayed as a color, the color providing a visual indicator to the presence of prestored data from second data source relevant to the displayed time and date fields.

In an aspect of the present teaching a method is provided for generating a graphical user interface on a display of a computing device, the method comprising:
identifying a first set of the data from the first data source;
selecting a subset of the first set of the data from the first data source for display within an available space within a display area;
displaying at least a portion of the first set of data as a moving image within the display area; and
subsequently displaying the subset within the display area.

In this way a user of the device is presented—during the rendering of the image of the subset of the first set of the data from the first data source—with a moving image indicating to the user that the ultimately displayed image within the area is a portion of the available data that could be displayed. As a result, the display of at least a portion of the first set of data as a moving image prompts a user to subsequently scroll through the displayed subset to access data fields within the first set but not initially displayed in the displayed subset. The displayed subset does not have to be accompanied by a scroll bar or other conventional visual indicators of the possibility of scrolling through the displayed data, the user has been advised a priori to the final generated displayed subset, that scrolling is possible.

In one aspect, the subset of the first set is selected from within the first set such that the first set of data comprises data that sequentially leads into and follows the displayed subset.

The generation of the graphical display may comprise generating a drop down field within the display and populating that drop down field.

These embodiments will be described and illustrated primarily in relation to computing devices such as communication devices that are adapted to communicate wirelessly various types of networks. It will be appreciated by those skilled in the art, however, that this description is not intended to limit the scope of the described embodiments to implementation on these particular systems or to wireless-enabled devices. For example, the embodiments described herein may be applied to any appropriate communication device or data processing device, whether or not it is adapted to communicate with another communication or data processing device over a fixed or wireless connection, whether portable or wirelessly enabled or not, whether provided with voice communication capabilities or not. The computing device can be adapted to process data and carry out operations on data in response to user commands for any number of purposes, including productivity and entertainment. Thus, the embodiments described herein may be implemented on computing devices adapted for content browsing, communication or messaging, including without limitation cellular phones, smartphones, wireless organizers, personal digital assistants, desktop computers, terminals, laptops, tablets, handheld wireless communication devices, notebook computers, ebook readers, entertainment devices such as MP3 or video players, and the like. Unless expressly stated, a computing or communication device may include any such device.

FIG. 1 is a block diagram of an exemplary embodiment of a computing device 100. The computing device 100 includes a number of components such as a main processor 102 that controls the overall operation of the computing device 100. Communication functions, including data and voice communications, are performed through a communication subsystem 104. Data received by the computing device 100 can be decompressed and decrypted by decoder 103, operating according to any suitable decompression techniques, and encryption/decryption techniques according to various standards, such as Data Encryption Standard (DES), Triple DES, or Advanced Encryption Standard (AES). Image data is typically compressed and decompressed in accordance with appropriate standards, such as JPEG, while video data is typically compressed and decompressed in accordance with appropriate standards, such as H.26× and MPEG-x series standards.

The communication subsystem 104 receives messages from and sends messages to a wireless network 200. In this exemplary embodiment of the computing device 100, the communication subsystem 104 is configured in accordance with one or more of Global System for Mobile Communication (GSM), General Packet Radio Services (GPRS) standards, Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM, GPRS, EDGE, or UMTS, and optionally other network communications. With newer network protocols, these channels are capable of supporting both circuit switched voice communications and packet switched data communications.

Other wireless networks can also be associated with the computing device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE, HSPA, HSPA+, EVDO and UMTS, or fourth-generation (4G) networks such as LTE and LTE Advanced. Some other examples of data-centric networks include WiFi 802.11™, Mobitex™ and DataTAC™ network communication systems. Examples of other voice-centric data networks include Personal Communication Systems (PCS) networks like GSM and Time Division Multiple Access (TDMA) systems.

The mobile device 100 may be provided with additional communication subsystems, such as the wireless LAN (WLAN) communication subsystem 105 also shown in FIG. 1. The WLAN communication subsystem may operate in accordance with a known network protocol such as one or more of the 802.11™ family of standards developed by IEEE. The communication subsystem 105 may be separate from, or integrated with, the communication subsystem 104 or with the short-range communications module 122. As noted above, voice communication capabilities and connectivity to voice-centric networks is not mandatory for the operation of the computing device 100 with the within embodiments. Thus, the wireless communication subsystem 104 may be omitted. If so, optionally a dongle or other peripheral device (not shown) may be connected to the device 100 to provide the device 100 with access to the wireless network 200.

The main processor 102 also interacts with additional subsystems such as a Random Access Memory (RAM) 106, a flash memory 108, a display 110, other data and memory access interfaces such as an auxiliary input/output (I/O) subsystem 112 or a data port 114, a keyboard 116, a speaker 118, a microphone 120, the short-range communications 122 and other device subsystems 124. Each interaction causes a power event that has an effect on the battery consumption of the device. Certain subsystems are more intensive power consumers than other subsystems. The communication device may also be provided with an accelerometer 111, which may be used to detect gravity- or motion-induced forces and their direction.

Detection of such forces applied to the device 100 may be processed to determine a response of the device 100, such as an orientation of a graphical user interface displayed on the display assembly 110 in response to a determination of the current orientation of the device 100.

In some embodiments, the user device 100 may comprise a touchscreen-based device, in which the display interface 110 is a touchscreen interface that provides both a display for communicating information and presenting graphical user interfaces, as well as an input subsystem for detecting user input that may be converted to instructions for execution by the device 100. Indeed the present teaching is particularly suited for such touchscreen display interfaces.

The touchscreen display interface 110 may be the principal user interface provided on the device 100, although in some embodiments, additional buttons, variously shown in the figures or a trackpad, or other input means may be provided. In one embodiment, a transmissive TFT LCD screen 218 is overlaid with a clear touch sensor assembly 214 that supports single and multi-touch actions such as tap, double-tap, tap and hold, tap and drag, scroll, press, flick, and pinch. The touchscreen display interface 110 detects these single and multi-touch actions, for example through the generation of a signal or signals in response to a touch, which may then be processed by the processor 102 or by an additional processor or processors in the device 100 to determine the location of the touch action, whether defined by horizontal and vertical screen position data or other position data. Touch location data may include an area of contact or a single point of contact, such as a point at or near a center of the area of contact. The touchscreen display interface 110 may be provided with separate horizontal and vertical sensors or detectors to assist in identifying the location of a touch. A signal is provided to the controller 216, shown in FIG. 1, in response to detection of a touch. The controller 216 and/or the processor 102 may detect a touch by any suitable contact member on the touch-sensitive display 110. It will be appreciated that this touch interface is exemplary of the type of user interaction that may be provided to a user to allow activation of specific functions on the computing device. Other interface means may include those that make use of voice commands or other non-tactile interaction.

Some of the subsystems of the computing device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list.

A rendering circuit 125 is included in the device 100. When a user specifies that a data file which is accessed from one or more identifiable data stores within the device is to be viewed on the display 110, the rendering circuit 125 analyzes and processes the data file for visualization on the display 110. Rendering data files originally optimized or prepared for visualization on large-screen displays on a portable electronic device display often requires additional processing prior to visualization on the small-screen portable electronic device displays. This additional processing may be accomplished by the rendering engine 125. As will be appreciated by those of skill in the art, the rendering engine can be implemented in hardware, software, or a combination thereof, and can comprise a dedicated image processor and associated circuitry, or can be implemented within main processor 102.

The computing device 100 can send and receive communication signals over the wireless network 200 after required network registration or activation procedures have been completed. Network access is associated with a subscriber or user of the computing device 100. To identify a subscriber, the computing device 100 requires a SIM/RUIM/UICC card 126 (i.e. Subscriber Identity Module, Removable User Identity Module, Universal Integrated Circuit Card, or the like) or another suitable identity module to be inserted into a SIM/RUIM/UICC interface 128 in order to communicate with a network. The SIM/RUIM/UICC card 126 is one type of a conventional "smart card" that can be used to identify a subscriber of the computing device 100 and to personalize the computing device 100, among other things. Without the SIM/RUIM/UICC card 126, the computing device 100 is not fully operational for communication with the wireless network 200. By inserting the SIM/RUIM/UICC card 126 into the SIM/RUIM/UICC interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM/UICC card 126 includes a processor and memory for storing information. Once the SIM/RUIM/UICC card 126 is inserted into the SIM/RUIM/UICC interface 128, it is coupled to the main processor 102. In order to identify the subscriber, the SIM/RUIM/UICC card 126 can include some user parameters such as an International Mobile Subscriber Identity (IMSI). An advantage of using the SIM/RUIM/UICC card 126 is that a subscriber is not necessarily bound by any single physical mobile device. The SIM/RUIM/UICC card 126 can store additional subscriber information for a mobile device as well, including datebook (or calendar) information and recent call information. Alternatively, user identification information can also be programmed into the flash memory 108.

The computing device 100 may be a battery-powered device including a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the computing device 100. Although current technology makes use of a battery, future technologies such as micro fuel cells can provide the power to the computing device 100.

The computing device 100 also includes an operating system 134 and software components 136 to 152 which are described in more detail below. The operating system 134 and the software components 136 to 152 that are executed by the main processor 102 are typically stored in a persistent store such as the flash memory 108, which can alternatively be a read-only memory (ROM) or similar storage element (not shown). Those skilled in the art will appreciate that portions of the operating system 134 and the software components 138 to 152, such as specific device applications, or parts thereof, can be temporarily loaded into a volatile store such as the RAM 106. Select other modules 152 may also be included, such as those described herein. Other software components can also be included, as is well known to those skilled in the art.

The subset of software applications 136 that control basic device operations, including data and voice communication applications, will normally be installed on the computing device 100 during its manufacture. Other software applications include a message application 138 that can be any suitable software program that allows a user of the computing device 100 to send and receive electronic messages. Various alternatives exist for the message application 138 as is well known to those skilled in the art. Messages that have been sent or received by the user are typically stored in the flash memory 108 of the computing device 100 or some other suitable storage element in the computing device 100. In at least some embodiments, some of the sent and received messages can be stored remotely from the device 100 such as in a data store of an associated host system with which the computing device 100 communicates.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the computing device 100 is turned off or loses power.

Figure 3:
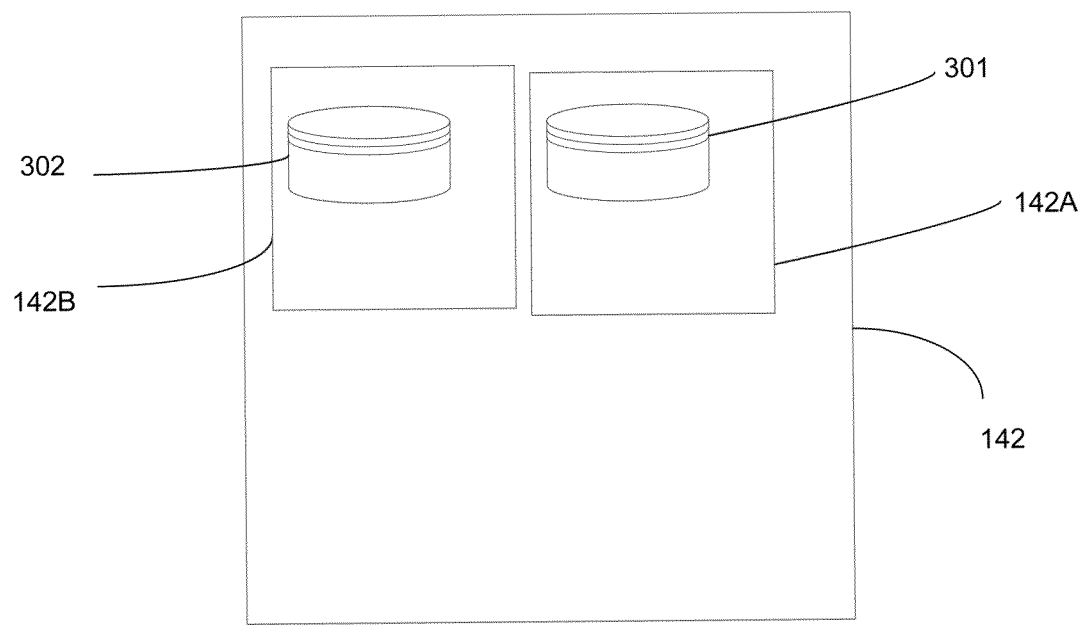
FIG. 3 is a schematic diagram showing specific calendar and scheduler modules of a PIM.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. Within the context of the present teaching, and as shown in FIG. 3, a scheduler 142A and a calendar 142B module may be considered as examples or representative of individual PIM applications. It will be understood that this reference to "applications" is not to limit the present teaching to explicit independent executable applications in that certain configurations may provide each of the modules as different interfaces to time and date information and data. Furthermore certain configurations may allow for independent access to calendar and scheduler information whereas other configurations may only allow a user to access schedule information through an already open calendar. These and other configurations should be considered as falling within the scope of the present teaching. In this way a calendar module within the context of the present teaching should be considered as any module that stores calendar data in a store that is identifiable as a calendar data store 302. A scheduler module should be considered as any module that stores scheduler data in a store that is identifiable as a scheduler data store. This data is relevant to the user schedule. This may be updated by a user directly accessing the calendar module 142B or by a user creating a new scheduler event through the scheduler module 142A. The scheduler module 142A provides access to data that is stored in a scheduler data store 301.

PIM data items can be seamlessly integrated, synchronized, and updated via the wireless network 200 with the mobile device subscriber's corresponding data items stored and/or associated with a host computer system. This functionality creates a mirrored host computer on the computing device 100 with respect to such items. This can be particularly advantageous when the host computer system is the mobile device subscriber's office computer system. Some or all of the data items stored at the computing device 100 may be indexed for searching on the device 100 either through a corresponding application, such as the PIM 142, or another suitable module. In addition, the items may be searchable using a unified search process implemented in the device operating system 134. For example, application data items can be encapsulated in a searchable entity class and registered with a unified search engine on the device 100 that executes searches against all registered data repositories on the device based on received queries. The search engine can also be configured to invoke a search process of external resources, such as Internet search engines or remote databases. In the context of entering data directly onto the computing device through the computing device, it will be appreciated and understood however that the functionality available to user of the computing device is typically less than that available to the user of the host computer system.

The computing device 100 also includes a connect module 144, and an information technology (IT) policy module 146. The connect module 144 implements the communication protocols that are required for the computing device 100 to communicate with the wireless infrastructure and any host system, such as an enterprise system, with which the computing device 100 is authorized to interface. The connect module 144 includes a set of Application Programming Interfaces (APIs) that can be integrated with the computing device 100 to allow the computing device 100 to use any number of services associated with the enterprise system or with other systems accessible over the network 200. The connect module 144 allows the computing device 100 to establish an end-to-end secure, authenticated communication pipe with the host system. A subset of applications for which access is provided by the connect module 144 can be used to pass IT policy commands from the host system to the computing device 100. This can be done in a wireless or wired manner.

These instructions can then be passed to the IT policy module 146 to modify the configuration of the device 100. Alternatively, in some cases, the IT policy update can also be done over a wired connection.

Other types of software applications can also be installed on the computing device 100, such as browsers 150, other user agents 148, and other modules 152. These software applications can be third party applications, which are added after the manufacture of the computing device 100. Other examples of third party applications include games, calculators, utilities, etc.

The additional applications can be loaded onto the computing device 100 through at least one of the wireless network 200, the auxiliary I/O subsystem 112, the data port 114, the short-range communications subsystem 122, or any other suitable device subsystem 124. This flexibility in application installation increases the functionality of the computing device 100 and can provide enhanced on-device functions, communication-related functions, or both. For example, secure communication applications can enable electronic commerce functions and other such financial transactions to be performed using the computing device 100.

The data port 114 enables a subscriber to set preferences through an external device or software application and extends the capabilities of the computing device 100 by providing for information or software downloads to the computing device 100 other than through a wireless communication network. The alternate download path can, for example, be used to load an encryption key onto the computing device 100 through a direct and thus reliable and trusted connection to provide secure device communication. The data port 114 can be any suitable port that enables data communication between the computing device 100 and another computing device. The data port 114 can be a serial or a parallel port. In some instances, the data port 114 can be a USB port that includes data lines for data transfer and a supply line that can provide a charging current to charge the battery 130 of the computing device 100.

The short-range communications subsystem 122 provides for communication between the computing device 100 and different systems or devices, without the use of the wireless network 200. For example, the subsystem 122 can include an infrared device and associated circuits and components for short-range communication. Examples of short-range communication standards include standards developed by the Infrared Data Association (IrDA), Bluetooth™, and the 802.11™ family of standards.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touchscreen, mouse, track ball, infrared fingerprint detector, or a roller wheel with dynamic button pressing capability. The keyboard 116 may be an alphanumeric keyboard and/or telephone-type keypad. However, other types of keyboards can also be used. A composed item can be transmitted over the wireless network 200 through the communication subsystem 104. It will be appreciated that if the display 110 comprises a touchscreen, then the auxiliary subsystem 112 may still comprise one or more of the devices identified above.

For voice communications, the overall operation of the computing device 100 is substantially similar, except that the received signals are output to the speaker 118, and signals for transmission are generated by the microphone 120. Alternative voice or audio I/O subsystems, such as a voice message recording subsystem, can also be implemented on the computing device 100. Although voice or audio signal output is accomplished primarily through the speaker 118, the display 110 can also be used to provide additional information such as the identity of a calling party, duration of a voice call, or other voice call related information.

The communication subsystem component 104 may include a receiver, transmitter, and associated components such as one or more embedded or internal antenna elements, Local Oscillators (LOs), and a processing module such as a Digital Signal Processor (DSP) in communication with the transmitter and receiver. Signals received by an antenna through the wireless network 200 are input to the receiver, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP. In a similar manner, signals to be transmitted are processed, including modulation and encoding, by the DSP, then input to the transmitter for digital-to-analog (D/A) conversion, frequency up conversion, filtering, amplification and transmission over the wireless network 200 via an antenna. The DSP not only processes communication signals, but also provides for receiver and transmitter control, including control of gains applied to communication signals in the receiver and the transmitter. When the computing device 100 is fully operational, the transmitter is typically keyed or turned on only when it is transmitting to the wireless network 200 and is otherwise turned off to conserve resources. Similarly, the receiver is periodically turned off to conserve power until it is needed to receive signals or information (if at all) during designated time periods. Other communication subsystems, such as the WLAN communication subsystem 105 or a WPAN communication subsystem, not shown, may be provided with similar components as those described above configured for communication over the appropriate frequencies and using the appropriate protocols. The particular design of the communication subsystem 104, 105, or other communication subsystem is dependent upon the communication network 200 with which the computing device 100 is intended to operate. Thus, it should be understood that the foregoing description serves only as one example.

Figure 2:
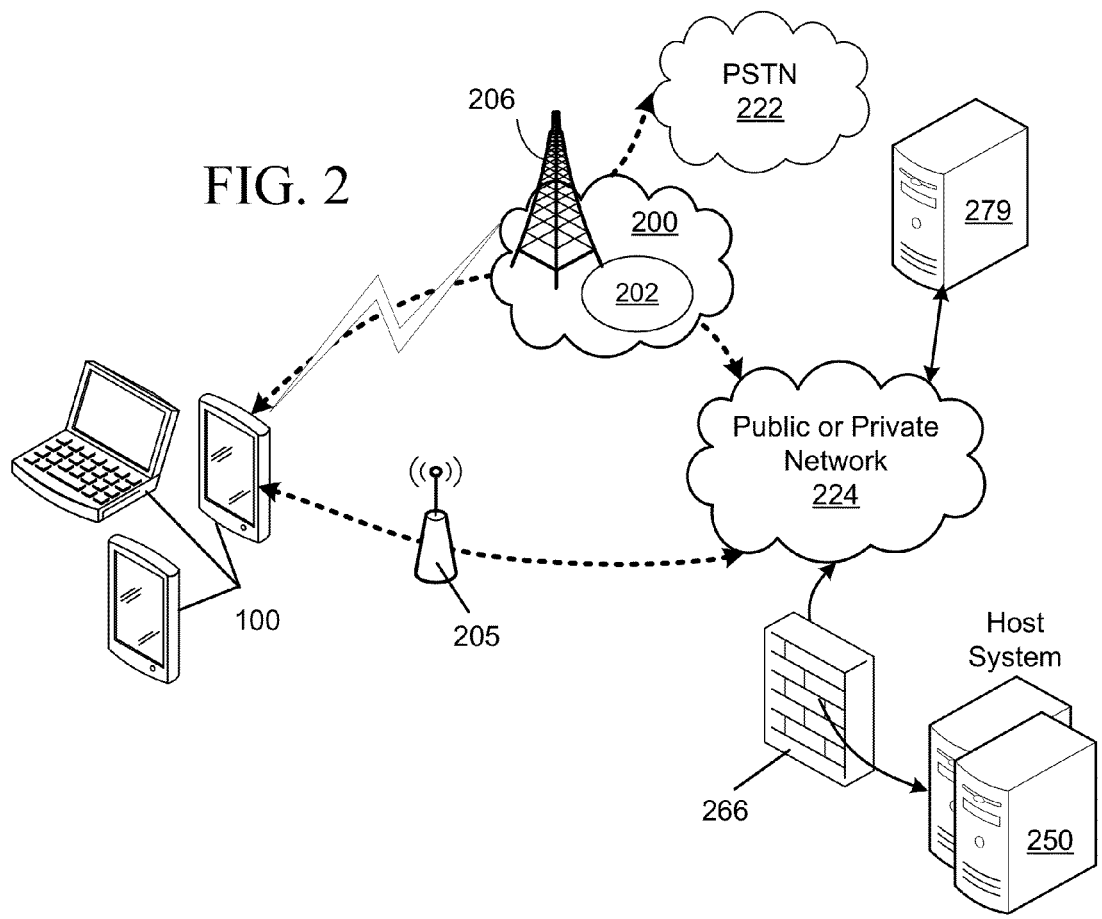
FIG. 2 is a schematic diagram of an exemplary network topology for use with the computing device of FIG. 1.

FIG. 2 illustrates a possible network topology for the computing device 100, including paths for data and voice traffic, and including a host or enterprise system 250. The host or enterprise system 250 will typically be a corporate enterprise or other local area network (LAN), but can also be a home office computer or some other private or quasi-private system, for example a subscription-based Internet service. Typically, a number of communication devices 100 can communicate wirelessly with the host or enterprise system 250 through one or more nodes 202 of the wireless network 200.

The host or enterprise system 250 comprises a number of network components, not shown, connected to each other by a network. Within the system 250, for example, user (including administrator) computers may be situated on a LAN connection, and one or more of these desktop computers can be provided with connection facilities for loading information (e.g. PIM data, private symmetric encryption keys to facilitate secure communications) from the user computer to the computing device 100, and can be particularly useful for bulk information updates often performed in initializing the computing device 100 for use. To facilitate the operation of the computing device 100 and the wireless communication of messages and message-related data between the computing device 100 and components of the host system 250, a number of wireless communication support components are provided within the system 250 (not shown). In some implementations, the wireless communication support components can include one or more data stores, a message management server, a mobile data server, a web server, such as Hypertext Transfer Protocol (HTTP) server, a contact server, and a device manager module including an information technology policy server and editor. HTTP servers can also be located outside the host or enterprise system, as indicated by the HTTP server 279 attached to the network 224. The mobile data server can also connect to the Internet or other public network through an enterprise HTTP server or other suitable web server such as a File Transfer Protocol (FTP) server, to retrieve webpages and other data. Requests for webpages are typically routed through mobile data server and then to the enterprise HTTP server, through suitable firewalls and other protective mechanisms. The web server then retrieves the webpage over the Internet, and returns it to mobile data server. The mobile data server is typically provided, or associated, with an encoder that permits retrieved data, such as retrieved webpages, to be decompressed and compressed, using any suitable compression technology (e.g. YK compression, JPEG, MPEG-x, H.26x and other known techniques), and encrypted (e.g. using an encryption technique such as DES, Triple DES, or AES), and then pushed to the computing device 100 via the shared network infrastructure 224 and the wireless network 200. Those skilled in the art know how to implement these various components. Other components can also be included as is well known to those skilled in the art.

The computing device 100's access to IP networks and to a public switched telephone network (PSTN), if applicable, can be provided through the wireless network 200, which comprises one or more nodes 202 configured for communication in accordance with a suitable mobile telephony standard. In turn, the wireless network 200 provides the computing device 100 with connectivity to the Internet or other public wide area network 224, and thence to the host or enterprise system 250. At the same time, if the computing device 100 is a multiple-mode device, it may also communicate with the host or enterprise system 250 over an enterprise LAN or WLAN, represented by the access point 205. It will be appreciated by those skilled in the art, however, that access to the host system 250 need not be limited to access via the enterprise network (whether wireless or not). Instead, the computing device 100 may access the host or enterprise system 250 over another network, such as the wide area IP network 224, via different access means, such as an access point located at the communication device user's home, or at a public or private Wi-Fi hotspot.

In this exemplary embodiment, the computing device 100 communicates with the host or enterprise system 250 through node 202 of the wireless network 200 and a shared network infrastructure 224 such as a service provider network or the public Internet. Access to the host or enterprise system can be provided through one or more routers (not shown), and computing devices of the host or enterprise system 250 can operate from behind a firewall or proxy server 266. A proxy server provides a secure node and a wireless internet gateway for the host or enterprise system 250. The proxy server intelligently routes data to the correct destination server within the host or enterprise system 250.

For some wireless networks 200 or LANs 205, the computing device 100 may be registered or activated with the respective network. A process for identifying a subscriber to a cellular network using a SIM or other identifier card 126 is described above. Other methods of registering or identifying the computing device 100 to various networks will be known to those of ordinary skill in the art. However, registration or activation may not be required for all wireless networks 200, LANs or WLANs, as some networks may allow access without prior registration or activation. The computing device 100 may also be provisioned or configured to access one or more networks. Methods of provisioning services on a computing device 100 will be generally known to those skilled in the art, but as a non-limiting example, a request for registration may be sent from the computing device 100 to a registration server of a service (not shown). If the request is approved, the registration server may transmit to the computing device 100 a service book or similar data item containing data and instructions to enable the computing device 100 to provision the service. The service book, when received at the computing device 100, may be self-executing, and permits the user to enter account information relevant to the associated service. This information is then transmitted from the computing device 100 to a provisioning server of the service provider (not shown), which then creates a service account associated with the computing device 100. Provisioning may also be carried out in compliance with the OMA DM (Open Mobile Alliance Device Management) specification version 1.2 or its predecessor or successor versions, published by the Open Mobile Alliance Ltd.

Figure 4A:
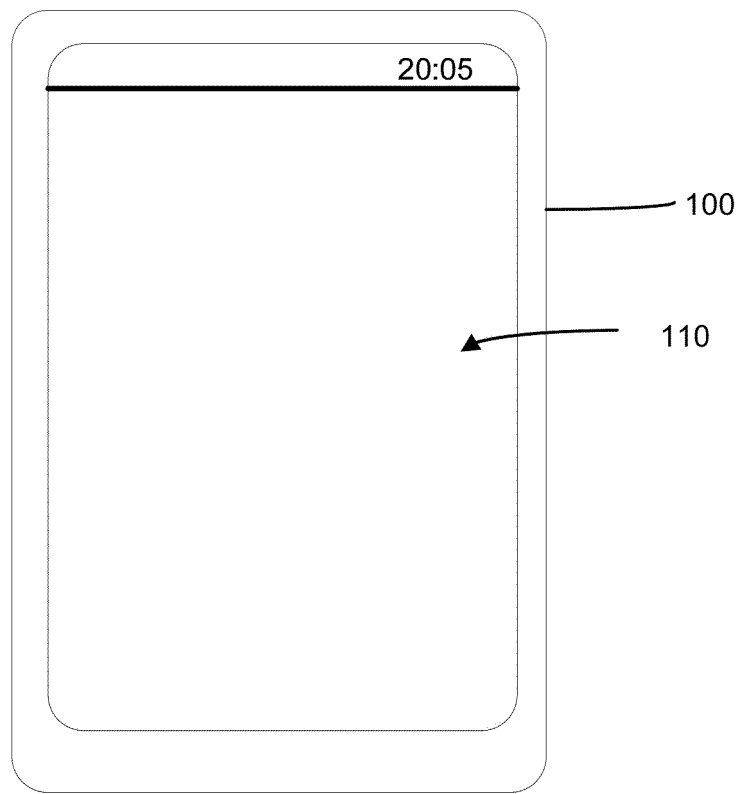
FIG. 4A is an illustration of a touch screen device.

FIG. 4A illustrates an example of a tablet computing device or a smartphone comprising a touchscreen display 110. While the footprint of the display 110 occupies a substantial proportion of the overall footprint of the device 100, it is still of a reduced area as compared to conventional computing displays. Typically, when displaying images or data on the screen 110, only portions of the images and other data elements such as text are visible. Typically, the remaining portions of the data that is intended to be displayed may be rendered visible in the display 110 in response to user events representing features such as scrolling (which causes the view of the displayed image to pan in a given direction), or by zooming out (which reduces the size of the view displayed on the display 110). It will be understood that by zooming out the data is displayed at a smaller resolution with the result that more data can be displayed within a given area of the display.

As is discussed with reference to FIG. 4B, and in one aspect of the present teaching, the device is configured to generate an area within a display of the device to display data from a first data source (Step 400). The device is also configured to provide for a retrieval of data from a second data source (Step 410). The data from the first and second data sources may then be concurrently displayed within the area defined in the display of the device (Step 420).

The computing device 100 may receive user input by means of one or more user input systems, such as a user input device or interface, including without limitation the keyboard 116, display 110 where the display is comprised in a touchscreen interface (referred to herein as a touchscreen display 110), microphone 120, trackball, buttons, trackpad, scroll wheel, optical joystick, rocker switch, and the like. Advantageously, the computing device 100 is provided with a touchscreen display 110. Several of these user input devices may be external to the computing device 100 itself; for example, a pointing device such as a mouse, trackball, tablet or touchpad may be provided as a peripheral component. In the case of a mobile device such as a smartphone or tablet computer, user input mechanisms are advantageously incorporated into the chassis of the computing device 100 itself for improved portability and mobility. For example, in a touchscreen computing device 100 such as a tablet or smartphone, the device 100 is provided not only with a touchscreen display 110, which may provide the main user input mechanism and permit alphanumeric data entry through display of an interactive virtual keyboard on the display 110, but also with one or more buttons, and/or an optical joystick or trackpad. These various user input devices and interfaces may be actuated by the user (for example, through the application of touch, pressure, and or directional movement) to control the operation of the computing device, for example to navigate through graphical user interfaces, menu structures, and the like, to select and initiate application or operating system commands for execution, to input data for processing or transmission by the computing device, or to change settings on the computing device.

Figure 4B:
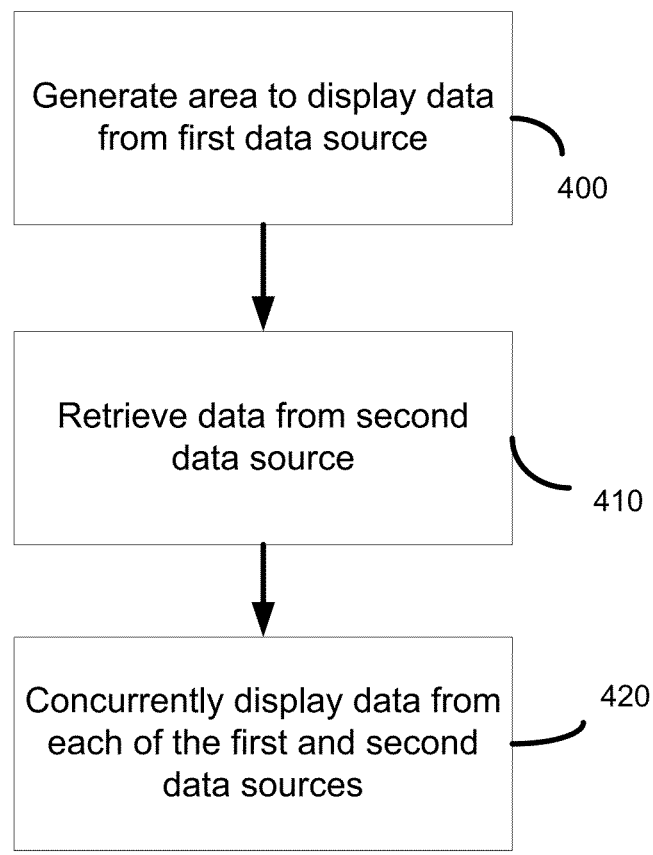
FIG. 4B is a process flow showing a methodology in accordance with the present teaching.
Figure 5:
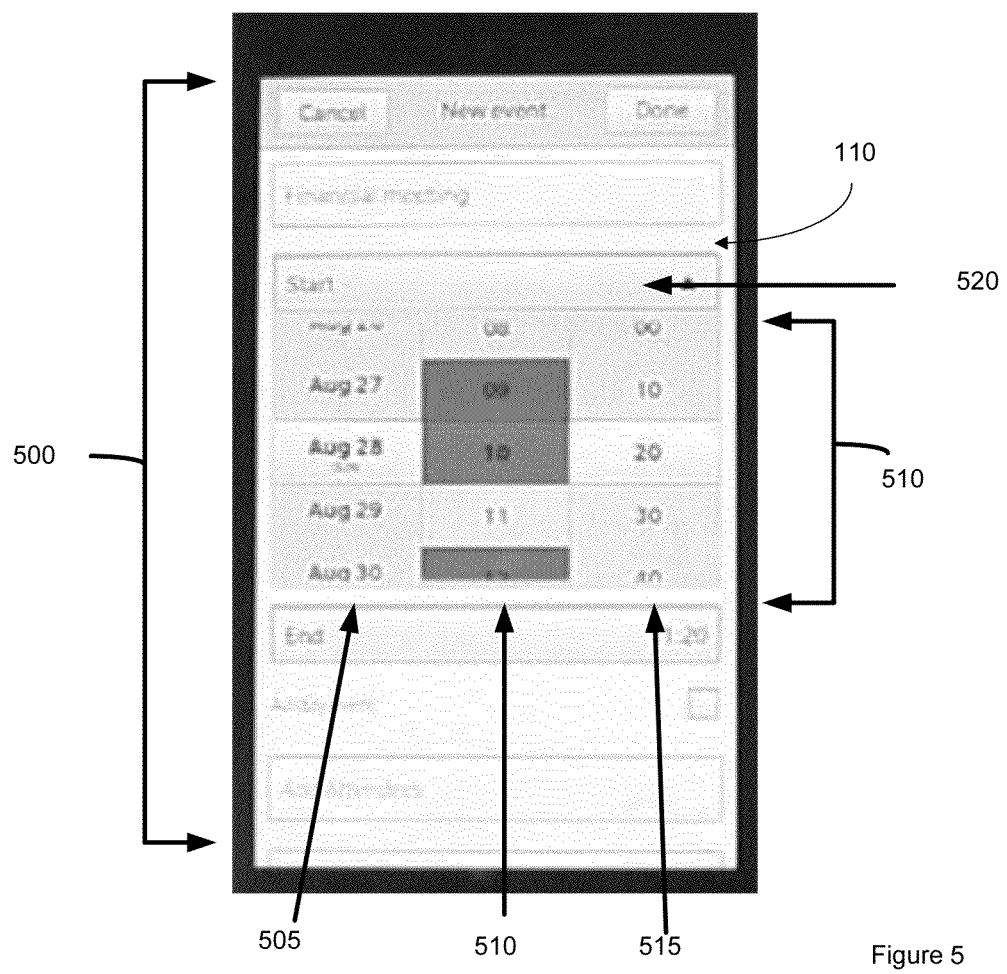
FIG. 5 is a graphic showing a generated graphical user interface in accordance with the present teaching.

FIG. 5 shows an example of a touchscreen interface 110 which has data from a first and second data source rendered together to provide a user with information on both scheduler and calendar data respectively in accordance with the general teaching of FIG. 4B. In this example a user wishes to generate a new scheduled appointment for a specific item. The user activates the scheduler module 142A which effects bring to the display 110 graphics and data from the scheduler module. This typically occupies a large proportion 500 of the footprint of the display. Within this large area, the scheduler module also generates on the display an area 510 of the user interface 110 to display data from the scheduler data source 301, a first data source. This data is displayed, in this exemplary arrangement in the form of a plurality of columns 505, 510, 515. A first column, 505, provides date information, a second column, 510, time in the form of hour information and a third column, 515, time in the form of minutes information. Each of the columns which are representative of data fields, are moveable relative to each other. In this way a user can scroll through dates and time to select an appropriate time. Desirably when a user selects the hour information through movement of the second column 510, a subsequent movement of the third column 515 provides for a selection of a specific minute period for that already selected hour.

On selection that time and date can then be written to the scheduler data store 301 for subsequent retrieval. By providing independently scrollable fields it is possible for a user to select days independently of the time and hour. This is particularly useful where for example the user wishes to arrange a meeting for a particular time and has flexibility on the dates, or indeed where the user has flexibility on the time but wants to vary the date. The scrolling of the fields will bring different data into view within the area 510. The user may touch and scroll through any one of the three fields and if scrolling through the time and date fields, 510, 515, it is evident to the user that the date field stays stationary—allowing the user to select different time options within a selected date. This can be visually relayed to the user by different coloring contrasts or the use of different identifiers. In the example of FIG. 5 a horizontal box or window 521 is generated about the selectable data entry fields to define what will ultimately become the user entry data window. This user data entry window 521—in the examples of FIG. 5 and FIG. 6 allows a user to select through a series of possible START time from an initial data set of August 28 at 10 o'clock and 20 minutes (as shown in FIG. 5) to the finally selected time of August 28 at 15:00 (shown in FIG. 6). It is analogous to the selection window of a slot machine whereby three carousels may rotate relative to the window but ultimately the determined selection is what is visible within the window 521.

In the example of FIG. 5, the selection is being made under the example of the Start time for a meeting. This is indicated by the Start field 520 displayed in the window 500.

To assist the user in selection of an appropriate time, the present teaching provides concurrently with the display of information related to the scheduler module 1428, information retrieved from the calendar module 1428. To achieve this, on accessing the scheduler module the present teaching also provides for a retrieval of data from a second data source, 302, the calendar data source. This data is time (and date) related to the data from the first data source 301.

As is shown in FIG. 5, the data from the calendar is then concurrently displayed in the form of a representation of availability within said area 510. As this data is provided to assist the user in selection of appropriate time to start their meeting, the representation of the data is selected in a form that will provide contextual information to a user. The representation of data from the calendar is visible through the data displayed from the scheduler. In the example of FIG. 5 the calendar data is provided as a color and is superimposed on those times where the calendar data indicates that there are already appointments or other potential conflicts. In the example of FIG. 5 this is in the time slots 09, 10 and 12.

In this example, a single color is used to indicate whether the user of the device has potential conflicts. In other arrangements, the device may be configured to access or interrogate calendars of third parties to provide generalized information as to the potential conflict for multiple party events. For example in an intended meeting of two or more persons, the device may use a first color—for example green—where there is no conflict in the diaries of each of the intended parties. A second color—for example red—may be used where there is actual conflict. A third color—for example amber—may be used where there is availability for some of the parties- or certain categories of the parties—but not all. This provision of simultaneous information to the user within as single view obviates the user needing to toggle between the separate calendar and scheduler modules and recall during that toggling or transfer what is the data in each module. The concurrent display of data in a single view from each of the scheduler and calendar data stores reduces the number of times that the scheduler and calendar applications or interfaces need to be activated, As a result the power consumption of the device may be reduced.

Figure 6:
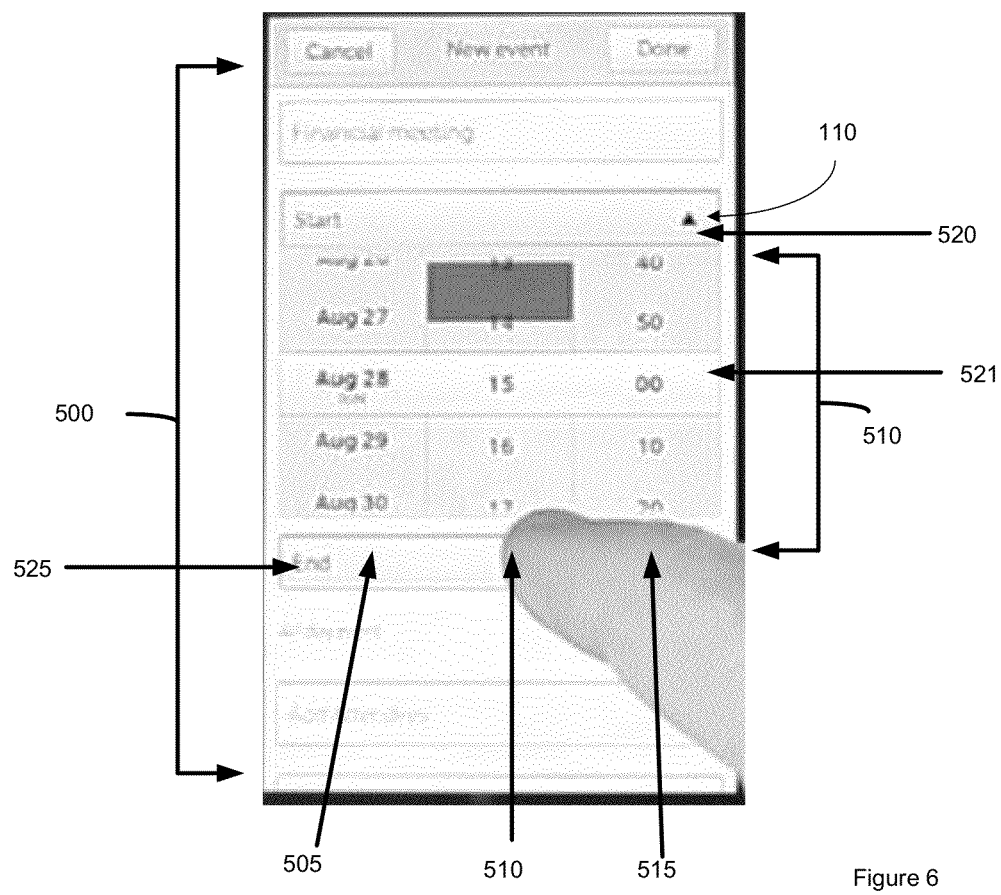
FIG. 6 is a graphic showing how the data generated in FIG. 5 may be user modified.
Figure 7:
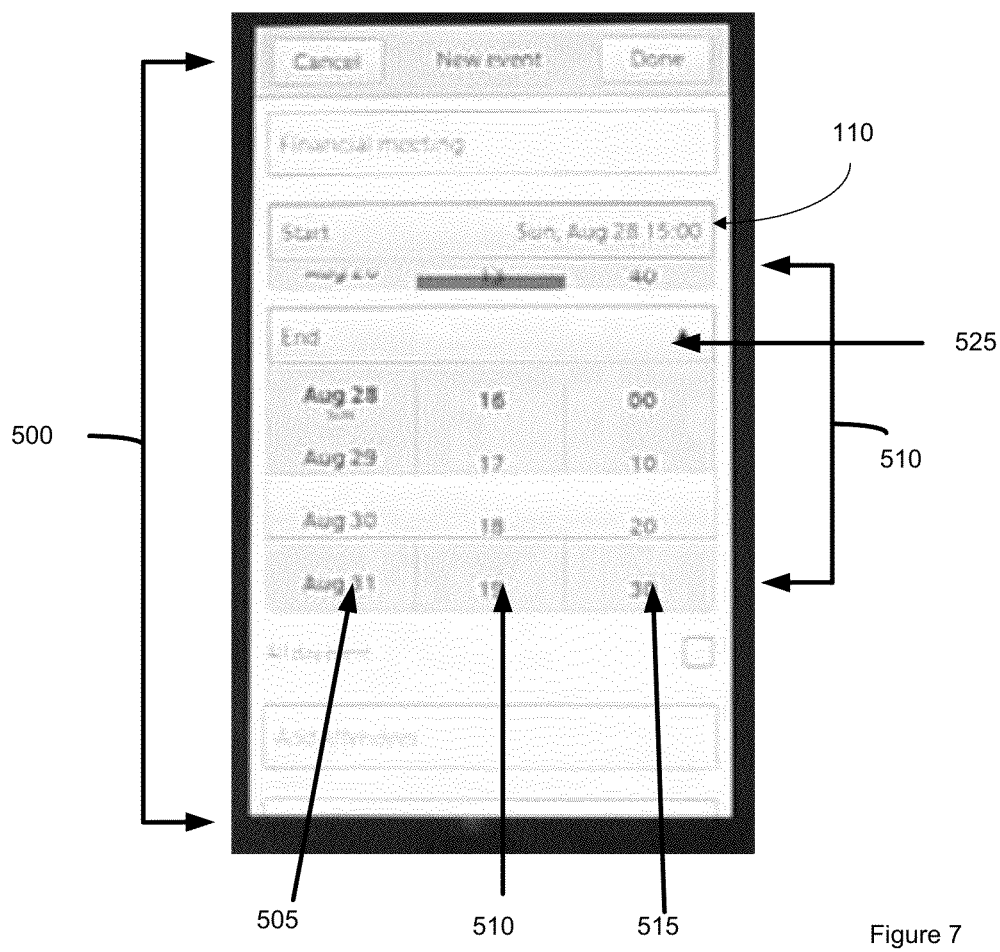
FIG. 7 is a graphic showing additional data that may be generated or rendered in accordance with the present teaching.

FIG. 6 shows how a user—through a conventional touch screen operation—may move the hour and minute data entry fields to ultimately select a time of 15:00. Once this is selected, this marks the end of the START time selection and the user may then initiate an opening within the area 510 data relevant to the END time 525. As shown in FIG. 7, the selection of the END time 525 brings a change in the display provided in the area 520 with the START data being moved out of view—although populated with the selected time- and replaced with END data—times and dates for a user to select when the scheduled event is to end.

The active area 510 remains but the data displayed in that area changes. In the example of FIG. 7 it will be seen that there is no color overlay or indication of a conflict shown on the detailed dates and times. As a result the user is then provided with explicit information from their calendar that there is no conflicted prior engagements which then allows the user to select a time and date of their choice. Once the user has then made the necessary end time selection—in this example August 30 at 18:20, the selection process terminates. The data entered within the START and END windows is then written to the data store associated with the scheduler module.

It will be understood that the concurrent display of scheduler and calendar data per the above examples has presented the calendar information in the form of a color that is overlaid with conflicting appointment times within the scheduler data fields. In other configurations the presence of a conflict could be visually communicated in another way. Examples include the presence of visual indicators that are provided to one side of the scheduler data fields such as a line provided along those times where there are potential conflicts. This may be appropriate in situations for example where there are extended block out periods identified from the calendar data.

The present teaching may also provide levels of granularity as to potential conflict by also highlighting specific minute regions where there is an identified calendar entry which may conflict with the new schedule event. In the examples illustrated the conflict color indicative of a potential clash with a calendar event has been described as being located only over the hour section of the displayed scheduler information. By highlighting the minute region, specific time slots within an identified hour may be selectable although the entire hour may not be available. Furthermore, highlighting the date field may provide an indication that the entire day is already booked.

It will also be appreciated that where the concurrent display of data from each of the scheduler and calendar may be effected through an overlay of scheduler and calendar data that the present teaching should be construed as so limiting as any arrangement whereby a representation of data from the second data source is simultaneously visible with a representation of data displayed from the first data source should be considered as falling within the scope of the present teaching.

To this end the representation of data from the second data source may be located within a same field of view as a representation of data displayed from the first data source. This could be located to at least one side of a representation of data displayed from the first data source or any other configuration.

It will be further appreciated that the above teaching has described the representation of data from the second data source as a visual representation. It will be appreciated that this concurrent display of information provides the user with an indicator of a potential conflict concurrent with their entry of scheduler events as opposed to advising them after an event has been entered that there is a potential conflict. The benefit of this concurrent warning of a user could be provided in another aspect of the present teaching by an audible indicator derived from data of the second data source. For example the user may wish to enter a scheduler event for a specific time period. The device may be configured on display of the available schedule data entry fields to issue an audible warning that one or more of the presented schedule time slots are not available due to a calendar conflict. In another configuration one or more vibration or other motion indicators could be provided indicative of a potential conflict. For example if the user interface requires a tactile interaction by the user with the computing device, the device may be configured to generate a tactile warning to the user on detecting the user wishes to enter a schedule event that conflicts with a previously stored calendar event.

It will be appreciated from the above that the data presented in the area 510 is a subset of the available data that can be accessed by the user. This is typical of a display of a computing device where the dimensions of the display limit the available footprint within which data can be displayed to a user. Typically in such instances a user is prompted that additional data is available by the presence of a scroll bar or other visual indicator which prompts the user to then scroll through the displayed data to change that data which is visible within the window. The presence of a scroll bar or other explicit identifier does however occupy space within the display area which could be otherwise used for data. To address this problem the present teaching provides an alternative indicator to indicate the presence of scrollable data within a display window.

Figure 10:
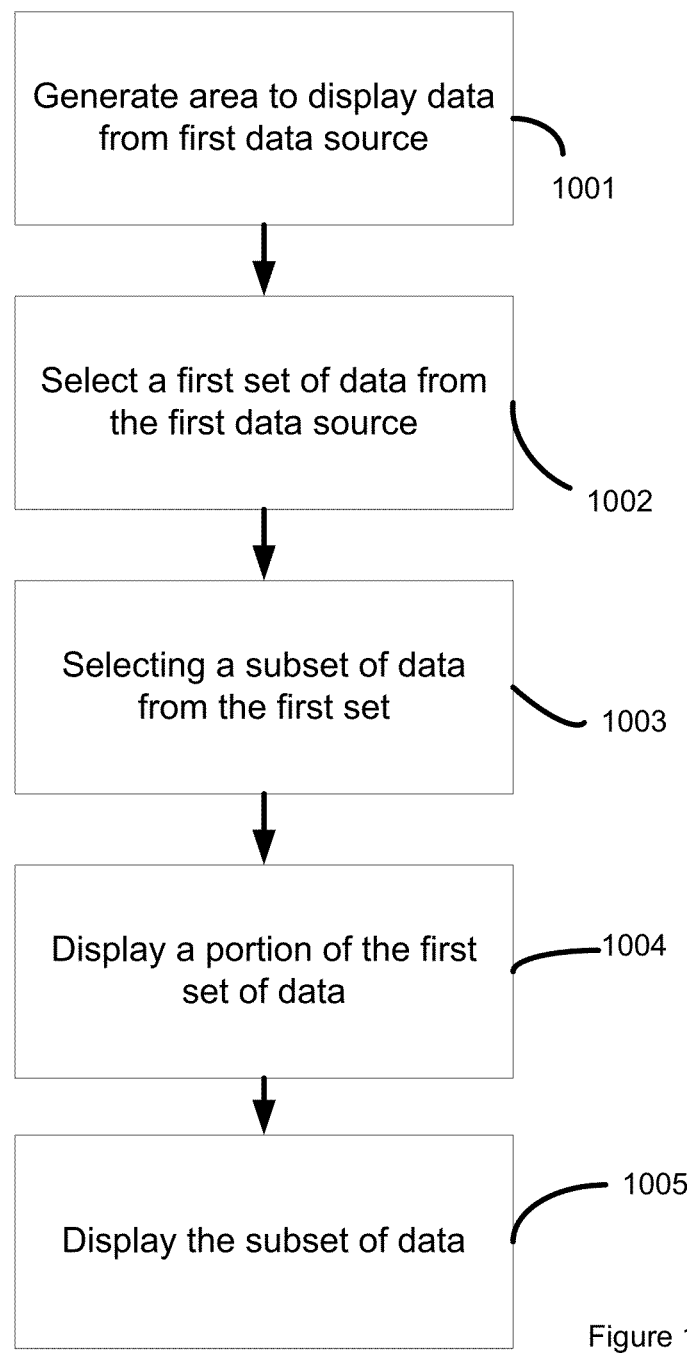
FIG. 10 is a process flow showing a methodology in accordance with the present teaching.

In the example described above, in the present teaching this alternative scrolling indicator is provided during the active generation of the graphical user interface on the display of the computing device. While it is particularly useful for the examples of the combined scheduler and calendar information described above, it will be understood that the method has application beyond this specific example. FIG. 10 shows how such an indicator of the presence of more data than that displayed may be provided to a user of a computing device in accordance with an aspect of the present teaching. The device is configured to populate an area within the display of the computing device with data from a first data source (Step 1001). A first set of data is then selected from a first data source (Step 1002). This data set is then processed to provide a selection of a subset of that first set of data (Step 1003). In rendering the display for presentation of the subset of data, the device is configured to provide within the display area a portion of the first set of data (Step 1004). This is desirably provided as a moving image whose movement varies the displayed data within the display area. This pre-display of a moving image prior to the display of a subset of the data (Step 1005) indicates to a user of the device that there is more data available than that shown in the final subset.

An implementation of the method of FIG. 10 will be described with respect to the specific data example of calendar and schedule data—with the understanding that the present teaching should not be construed as being limited to such data set.

In response to an input to the device, the device is configured to implement computing processes which will result in using an area 510 of the user interface 110 to display data from a first data source. In this example the data is time and date information from a scheduler module of the device. It is evident from the examples of FIGS. 5 through 7 that the area 510 allows a user to view in full detail the information regarding four horizontal time bar segments—FIG. 7 shows these as being 18:00, 18:10, 18:20 and 18:30 of the 30 August. In the examples of FIGS. 5 and 6 three full time segments are identifiable and the lead in and lead out segments are cut off—in a fashion similar to them disappearing from view through a window of a slot machine. The present teaching provides an arrangement whereby four appropriate time segments are selected as being intended for presentation within the area 510. These time segments represent a subset of the overall available time segments that could be presented to a user within the area 510, and are selected on a number of different factors including that based on the determined available space within the area for displaying content of a certain size. It will be understood that these parameters may be user selected. During the rendering of the graphic that will present the ultimate subset, the present teaching provides an initial presentation to the user of at least a portion of the first set of data as a moving image within the determined available space 510.

Figure 8:
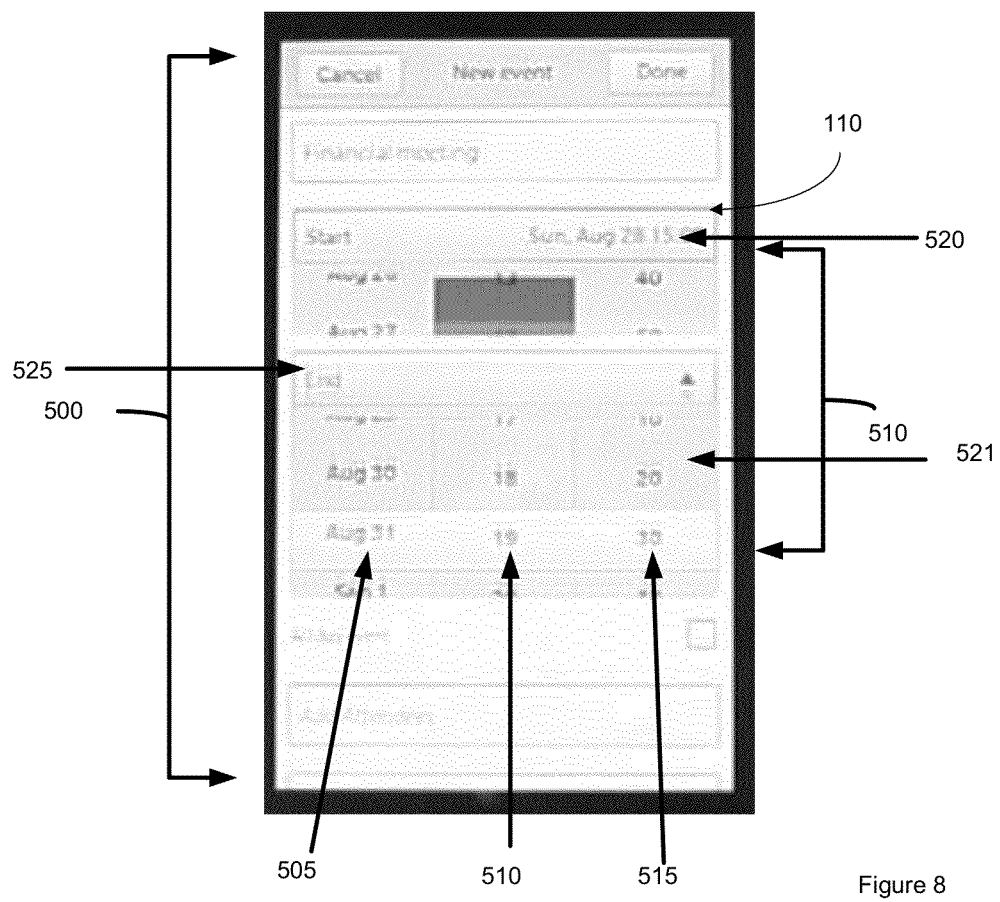
FIG. 8 shows how an animated or moving image may be presented to a user during rendering of a data input screen so as to indicate how the final data is representative of a larger data set.
Figure 9:
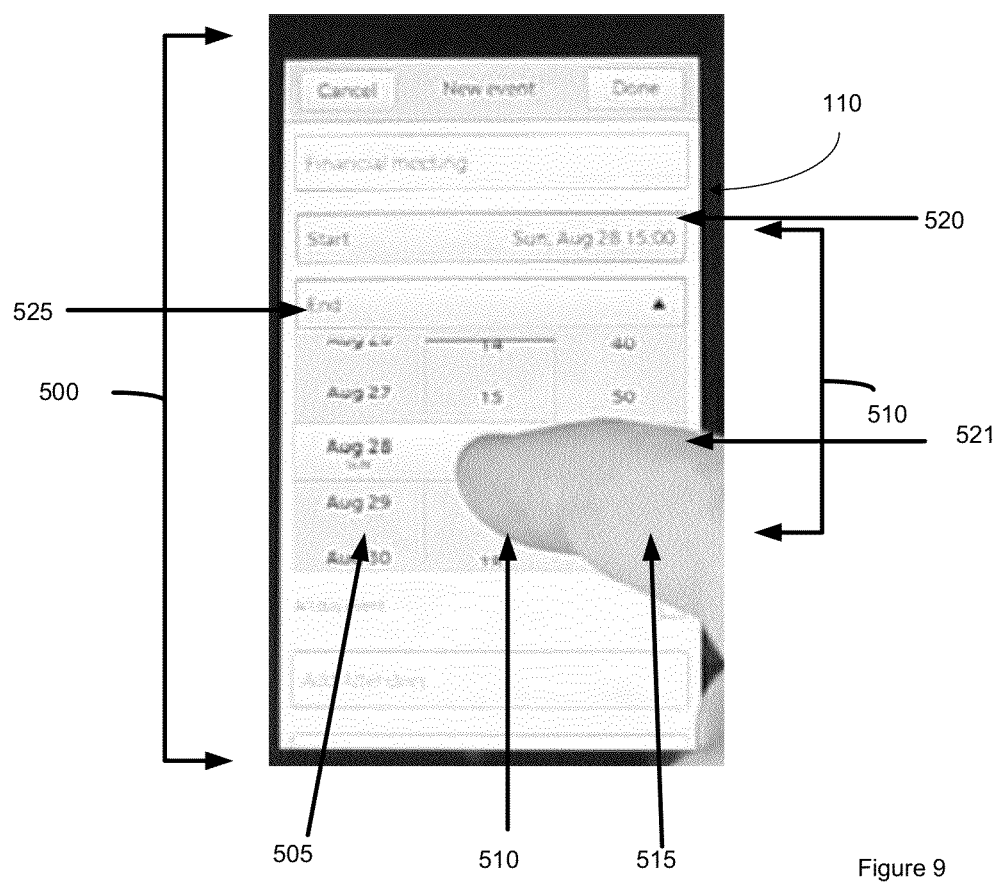
FIG. 9 shows such a final data set as displayed on the device.

As is clear from FIG. 8, when the user initial clicks or otherwise activates the END icon 525, the displayed data within the active area 510 changes. Initially the END icon moves upwardly within the area 510 towards the START icon 520 with the impression that it is covering the originally present data in the START window. At the same time, time and date information within what is ultimately going to form the END window data fields changes. In the example of FIG. 8 the user is initially presented with data reflective of August 31, at 19:20 and 19:30 with additional data both leaving and coming into view. This data is part of the overall set of scheduler data. During the migration of the display from START to END, this data is cycled through as a moving image to the user until they are ultimately presented what is the intended displayed subset within the determined available space. In this example of FIG. 9 this is a set of four data elements centred around a time on August 28 at 16:00 which is a sensible or default starting point for ending an event that is intended to start one hour previously at 15:00.

As the user is presented during this rendering process with a moving image comprising more data than the ultimately generated subset, the user is motivated a priori of the generated data window 510 that there is a possibility to access additional data than that initially presented to the user when the data window 510 is ultimately formed. This then provides an impetus to scroll that would not have been present if the window 510 had been rendered through a typical drop down window. The embodiments herein have been described and illustrated primarily in relation to resources such as calendar and scheduler modules may be extended as will be appreciated by those of skill in the art to other resources such as webpages, web applications, other rich media applications, and widgets; and to user agents such as browser applications (browsers) and drop down menus.

As described above when displayed on a computing device 100, not all of the content that may be accessed through the device may be currently visible on the display area of the graphical user interface. To effect selection of a particular data element the present teaching has been described with reference to a user input mechanisms that receives user input through user contact-primarily, manual manipulation—notionally these mechanisms may be considered as input mechanisms for detecting inputs either for cursor-based control or for touch-based control of the computing device 100. Cursor-based control, typically associated with pointing devices such as mice, permits the user to control the positioning of a cursor or other sprite displayed in a graphical user interface rendered on the display 110. When the cursor is positioned ("hovering") over a particular graphical user interface element, the input mechanism may be actuated (for example, by pressing a mouse button) to invoke a command associated with that element. Optical joysticks and trackpads may be used for cursor-based control. Touch-based control, typically associated with touchscreen displays 110, permits the user to more directly engage the graphical user interface elements displayed on the display 110 by touching or tapping the surface of the display 110 corresponding to that element. The touchscreen display 110 and its associated controller and processor 102 can be configured to also detect and identify gestures and multitouch input (directional input and multiple concurrent touch input, respectively).

In a browser or other runtime environment such as those described above, user input detected (a user event) at one or more of the user input mechanisms provided on the device 100 may be passed to the processor 102 for determination of the type of detected input. In the case of directional input received from a pointing device or another cursor-based control mechanism such as a trackpad or optical joystick, the processor 102 receives raw data concerning the user event, such as an indication of the application of external force or contact, magnitude, directional, location, timing, and/or speed information, and determines from the raw data what type of user event occurred, such as a cursor event, mouse event or a touch event, which can include both gestures (comprising a series of touch events) and multitouch input (comprising a series of touch events, some of which may be concurrent) as well as single-touch inputs. In the case of a touch event, the touchscreen display controller 216 may process the raw data representative of the user input. The result of the processing of the processor 102 and/or controller 216 is passed to the current application, i.e. the application corresponding to the active screen currently displayed at the device 100. The taxonomy and models used to define user events and facilitate user input will be known to those skilled in the art. The foregoing embodiments thus provide systems and methods for provide contextual information within a display that facilitates data entry and yet minimizes processor activity.

The systems and methods disclosed herein are presented only by way of example and are not meant to limit the scope of the subject matter described herein. Other variations of the systems and methods described above will be apparent to those in the art and as such are considered to be within the scope of the subject matter described herein. For example, it should be understood that steps and the order of the steps in the processing described herein may be altered, modified and/or augmented and still achieve the desired outcome. Throughout the specification, terms such as "may" and "can" are used interchangeably and use of any particular term should not be construed as limiting the scope or requiring experimentation to implement the claimed subject matter or embodiments described herein.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. Various functional units described herein have been expressly or implicitly described as modules and agents, in order to more particularly emphasize their independent implementation and operation. It is also noted that an agent, module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The various functional units may be implemented in hardware circuits comprising custom VLSI circuits or gate arrays; field-programmable gate arrays; programmable array logic; programmable logic devices; commercially available logic chips, transistors, and other such components. Modules implemented as software for execution by a processor or processors may comprise one or more physical or logical blocks of code that may be organized as one or more of objects, procedures, or functions. The modules need not be physically located together, but may comprise code stored in different locations, such as over several memory devices, capable of being logically joined for execution. Modules may also be implemented as combinations of software and hardware, such as a processor operating on a set of operational data or instructions.

A portion of the disclosure of this patent document contains material which is or may be subject to one or more of copyright, design patent, industrial design, or unregistered design protection. The rightsholder has no objection to the reproduction of any such material as portrayed herein through facsimile reproduction of the patent document or patent disclosure, as it appears in the Patent and Trademark Office patent file or records, but otherwise reserves all rights whatsoever.

The invention claimed is:

1. A method of generating a graphical user interface on a display of a computing device, the method comprising in response to an input to the device:
    receiving a user selection of a field;
    in response to the selection, displaying a drop down menu including a plurality of columns, where each of the plurality of columns independently move vertically in response swipe gestures on that column;
    for each of the columns:
        selecting a first set of data from a first data source for display within that column;
        selecting a subset of the first set of data from the first data source, the subset being selected based on the available area of the display;
        displaying the subset within that column;
        detecting a swipe gesture across a portion of that column;
        selecting a portion of the first set of data comprising more data of the first set of data than the selected subset; and
        prior to receiving user input within that column, displaying at least said portion of the first set of data as a moving image within that column to indicate to the user that more data is available in the first set of data than in the subset of the first set of data; and
    displaying data in the field corresponding to data in a predefined row of the plurality of columns.

2. The method of claim 1 wherein the display of at least a portion of the first set of data as a moving image prompts a user to subsequently scroll through the displayed subset to access data fields within the first set but not initially displayed in the displayed subset.

3. The method of claim 1 wherein the subset of the first set is selected from within the first set such that the first set of data comprises data that sequentially leads into and follows the displayed subset.

4. The method of claim 1 comprising:
    retrieving data from a second data source, the data from the second data source being time-related to the data from the first data source;
    displaying a representation of the data from the second data source within one of the plurality of columns.

5. The method of claim 4 comprising concurrently displaying the representation of data from the second data source with data from the first data source.

6. The method of claim 5 comprising subsequent to the concurrent display of the representation of data from the first and second data sources and, in response to an input to the device, permitting a writing of data to the first data source.

7. The method of claim 4 wherein the display of the representation of data from the second data source is adjacent a display of data from the first data source such that the graphical user interface correlates the data from the first and second data sources to provide contextual data.

8. The method of claim 4 wherein the representation of data from the second data source is simultaneously visible with a representation of data displayed from the first data source.

9. The method of claim 4 wherein the representation of data from the second data source is located within a same field of view as a representation of data displayed from the first data source.

10. The method of claim 4 wherein the representation of data from the second data source is located to at least one side of a representation of data displayed from the first data source.

11. The method of claim 4 wherein the first data source is scheduler module of the computing device and wherein the second data source is a calendar module of the computing device.

12. The method of claim 4 wherein the displayed data from the first data source comprises first and second data input fields.

13. The method of claim 12 wherein the first and second data input fields define time and date fields respectively.

14. The method of claim 13 wherein the data from the second data source is displayed as a color, the color providing a visual indicator to the presence of pre-stored data from second data source relevant to the displayed time and date fields.

15. The method of claim 12 wherein the first data source is scheduler module of the computing device, the second data source is a calendar module of the computing device and the first and second data input fields define time and date fields respectively
wherein the data from the second data source includes previously stored data from a calendar relating to the displayed time and date fields and indicating availability of a user within the displayed time and date fields.

16. The method of claim 4 wherein the first data source is scheduler module of the computing device, the second data source is a calendar module of the computing device
wherein the data from the second data source includes previously stored data from a plurality of calendars and indicating availability of a plurality of users within the displayed time and date fields.

17. The method of claim 1 wherein the first data source is scheduler module of the computing device.

18. An electronic device comprising a display and a processor, the processor being configured, in response to an input to the device, to execute the method of:
receiving a user selection of a field;
in response to the selection, displaying a drop down menu including a plurality of columns, where each of the plurality of columns independently move vertically in response swipe gestures on that column;
for each of the columns:
selecting a first set of data from a first data source for display within that column;
selecting a subset of the first set of data from the first data source, the subset being selected based on the available area of the display;
displaying the subset within that column;
detecting a swipe gesture across a portion of that column;
prior to receiving user input within that column, displaying at least said portion of the first set of data as a moving image within that column to indicate to the user that more data is available in the first set of data than in the subset of the first set of data; and
displaying data in the field corresponding to data in a predefined row of the plurality of columns.

19. An electronic device-readable medium bearing code which, when executed by one or more processors comprised in an electronic device, causes the electronic device to:
receive a user selection of a field;
in response to the selection, display a drop down menu including a plurality of columns, where each of the plurality of columns independently move vertically in response swipe gestures on that column;
for each of the columns:
select a first set of data from a first data source for display within that column;
select a subset of the first set of data from the first data source, the subset being selected based on the available area of the display;
display the subset within that column;
detect a swipe gesture across a portion of that column;
prior to receiving user input within that column, display at least said portion of the first set of data as a moving image within that column to indicate to the user that more data is available in the first set of data than in the subset of the first set of data; and
display data in the field corresponding to data in a predefined row of the plurality of columns.

* * * * *